March 14, 1961 G. O. CROWTHER 2,975,372
CATHODE FOLLOWER WITH TRIGGER MEANS TO ASSIST
DISCHARGE OF CAPACITANCE OF CATHODE CIRCUIT
Filed May 11, 1956
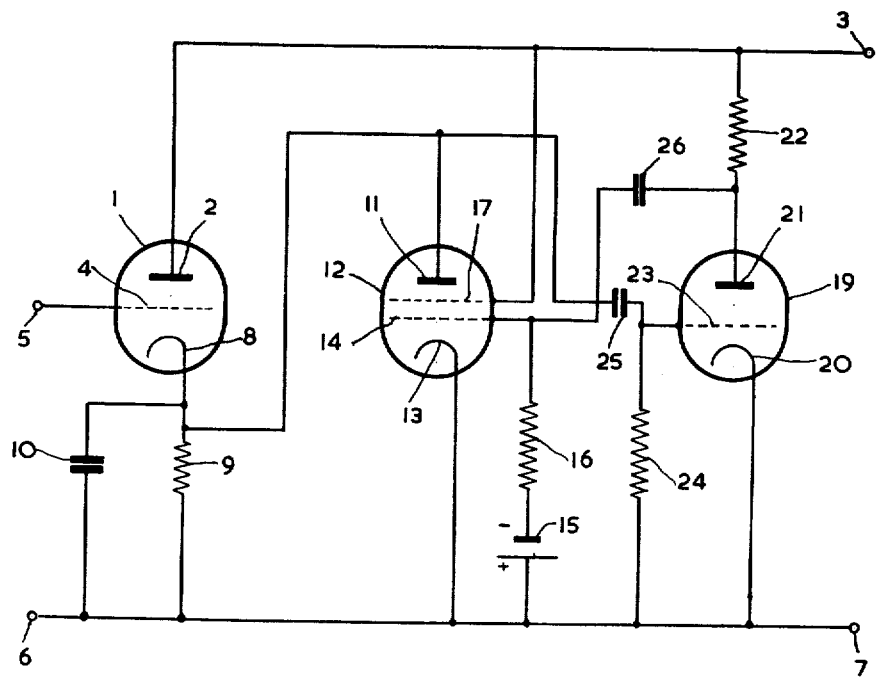
INVENTOR
GERALD OFFLEY CROWTHER
BY
AGENT

United States Patent Office 2,975,372
Patented Mar. 14, 1961

2,975,372

CATHODE FOLLOWER WITH TRIGGER MEANS TO ASSIST DISCHARGE OF CAPACITANCE OF CATHODE CIRCUIT

Gerald Offley Crowther, Cheam, England, assignor, by mesne assignments, to North American Philips Company, Inc., New York, N.Y., a corporation of Delaware Filed May 11, 1956, Ser. No. 584,374

Claims priority, application Great Britain May 13, 1955

2 Claims. (Cl. 328—213)

The invention relates to thermionic tube circuit arrangements each comprising a grid controlled high vacuum thermionic tube having in its cathode circuit a load in which capacitance exists as a part, for example a cathode follower.

A well known disadvantage of these circuits is that it is possible for the grid of the tube to be driven negative faster than the cathode can follow. The slow cathode-follow results from the stray capacitance which normally exists across the cathode load.

If this capacitance be denoted by C and the voltage across it by $v$ then the current required to discharge C at a steady rate is given by current $i = C\, dv/dt$, $t$ being time.

If the cathode is to follow the grid, $$\frac{dv}{dt}$$

must be substantially equal to the grid voltage rate of change, and therefore $i$ is predetermined. If, when the grid is driven negative, the stray capacitance can be discharged by the required current the cathode can follow the grid; if not, the tube cathode current becomes cut off and the cathode voltage $v$ falls at a rate determined by the resistance R which exists in parallel with capacitance C. The cathode voltage falls at this rate until the grid-cathode voltage is such that valve conduction may recommence, when cathode follower action is restored.

It is clear that the problem is the provision of a relatively high current for the discharge of the capacitance C.

According to the invention a circuit arrangement comprises a grid controlled high vacuum thermionic tube having in its cathode circuit a load in which capacitance exists as a part, in combination with means which becomes operative to assist current flow in this capacitance only during negative going excursions of the cathode.

Usually, the capacitance consists of unavoidable capacitance such as inter-electrode and other stray capacitance.

One preferred means comprises a trigger circuit which becomes operative by changing from a stable state to an unstable state, during which latter state the current flow in the capacitor is assisted.

If a trigger circuit is suitably connected to a cathode follower the potential of the cathode follower cathode can be forced in a negative direction by the trigger circuit immediately upon it (the trigger circuit) being triggered. This occurs at a substantially faster rate than the slow discharge rate of the cathode circuit alone and may be arranged to be as fast as the fall of cathode follower grid voltage. Generally the cathode follower will not permit forcing at a rate greater than the grid voltage fall since its own regulating action would tend to override external influences.

A circuit arrangement in accordance with the invention can with advantage be used in conjunction with a stabilizer circuit arrangement in accordance with U.S. Patent No. 2,752,555, issued June 26, 1956 which describes and claims, inter alia—a voltage stabilizer circuit capable of being switched from one stabilized and preset direct current output voltage to another stabilized and preset direct current output voltage, comprising an electric discharge tube connected between one of a pair of input terminals and one of a pair of output terminals, and forming a variable impedance means for producing a plurality of fractions of the output voltage at the output terminals, each fraction being independently preset, and further means enabling each of the fractions at separate times to be compared with a reference voltage, the result of the comparison being used to influence said variable impedance so as to cause the output voltage to stabilize at a value corresponding to the fraction being compared.

If a load having a capacitive component for example due to stray capacitance, is connected to the output terminals, it will be appreciated that, when it is desired to change the output voltage from one voltage to a lower voltage, the maximum rate of change will not exceed that due to the time constant of the load alone without the use of the present invention, but by means of the use of a circuit arrangement in accordance with the present invention this rate of change can be increased.

In order that the invention may be readily carried into effect, an embodiment will now be described, by way of example, with reference to the accompanying drawing in which is diagrammatically shown a flip-flop circuit arrangement suitably connected to a cathode follower. Reference numeral 1 indicates a tube arranged as a cathode follower having an anode 2 connected to a positive source 3 and a grid 4 connected to one of the input terminals 5. The other input terminal 6 is at ground line potential and is jointed to the negative terminal 7 complementary to terminal 3.

The cathode 8 of tube 1 has a cathode load resistor 9 across which there will be stray capacitance denoted by 10. The cathode 8 is also connected to the anode 11 of a tube 12 shown as a tetrode but which may be a pentode. Tube 12 has a cathode 13 joined to ground line 6, 7 and a control grid 14 supplied with a negative bias voltage from source 15 through grid resistor 16. There is also a screen-grid electrode 17 which is connected to the positive source 3. Tube 12 co-operates with a further tube 19 (shown as a triode) in a flip-flop circuit. The cathode 20 of tube 19 is joined to ground line 6, 7, the anode 21 is connected through a load resistor 22 to positive terminal 3, while the grid 23 is joined through resistor 24 to ground line 6, 7 and through capacitor 25 to anode 11. Anode 21 is also joined through capacitor 26 to control grid 14.

The operation of the circuit is as follows:

Normally the negative bias of source 15 is sufficient to hold tube 12 non-conducting while tube 19, being without bias, conducts. A fast negative going voltage transition applied to control grid 4 through input terminal 5 causes the voltage at cathode 8 to follow giving at least initially a fast negative going voltage. The anode 11 also goes negative with the cathode 8 and the control grid 23 of tube 19 is thus driven negative by way of the coupling capacitor 25. The anode current of tube 19 is thereby reduced and the voltage at anode 21 rises rapidly causing control grid 14 also to rise in voltage because of the coupling capacitor 26. The anode 11 now draws current with consequent further lowering of its voltage and the usual cumulative action ensues with tube 19 becoming completely non-conducting and tube 12 conducting. This cumulative action occurs in a short time enabling anode 11 to pass a substantial current which discharges the capacitor represented by 10 and the voltage of cathode 8 falls at a faster rate than that which would occur without the addition of tubes 12 and 19. Preferably the fall of voltage is sufficiently fast that the cathode 8 just follows the grid 4. The cathode follower action of tube 1 will prevent the voltage of cathode 8 from falling at a faster rate and further than that of grid 4.

The flip-flop circuit is now in a state which is unstable because the tube 19 is only held non-conducting while the coupling capacitor 25 is being discharged. Ultimately tube 19 conducts again and tube 12 reverts to its non-conducting state, preferably the coupling capacitors 25, 26 are of just sufficient capacitance to ensure that flip-flop action takes place so that rapid reversion to the stable state is possible. This rapid reversion is necessary because it is important that the flip-flop circuit be ready as soon as possible to co-operate with a further negative excursion of the cathode follower grid if such should occur. Flip-flop circuits of single tube type based on the blocking oscillator and the transitron may be used instead of the two tube type shown in the figure.

What is claimed is:

1. An electrical circuit comprising a first grid-controlled tube having a grid, a cathode, and an anode, load impedance means having one end connected to said cathode, a source of operating voltage connected between the other end of said impedance means and said anode, said load impedance means including a capacitance thereacross, means applying a signal voltage to said grid having occasional negative-going excursions, and means for discharging said capacitance to permit the voltage at said cathode to follow the voltage of said grid during said excursions, said discharging means comprising a second grid-controlled tube having an anode directly connected to said one end of said impedance means, a cathode connected to the other end of said impedance means, and a grid biased to render said second tube normally non-conductive, the voltage across said impedance means comprising the operating voltage for the anode circuit of said second tube, and means connected to the grid of said second tube to render said second tube conductive upon the occurrence of said negative-going excursions.

2. In a circuit of the type including a first amplifying device having an input electrode connected to a source of signal voltages and an output electrode connected to a load impedance and wherein the voltage across said load impedance substantially follows said signal voltage, and in which a capacitance connected across said impedance has a sufficiently large value to retard changes in voltage across said impedance occurring in response to changes in said signal voltages, circuit means for discharging said capacitance to permit said load impedance voltage to follow said signal voltage, said circuit means comprising a second amplifying device having an output electrode and an input electrode, means connecting said output electrode of said second amplifying device directly to one end of said impedance so that the voltage across said impedance comprises the operating voltage for the output electrode circuit of said second amplifying device, means biasing the input electrode of said second amplifying device to render it normally non-conductive, and means connected to the input electrode of said second amplifying device to render it conductive upon the occurrence of a predetermined change in said signal voltage.

References Cited in the file of this patent

UNITED STATES PATENTS

| | | |
|---|---|---|
| 2,511,093 | Atwood | June 13, 1950 |
| 2,519,256 | Lee | Aug. 15, 1950 |
| 2,536,916 | Dickinson | Jan. 2, 1951 |
| 2,714,705 | Volz | Aug. 2, 1955 |
| 2,778,935 | Ropiequet | Jan. 22, 1957 |